(12) United States Patent
Earhart

(10) Patent No.: US 7,577,657 B2
(45) Date of Patent: Aug. 18, 2009

(54) SYSTEM AND METHOD FOR UPDATING OBJECTS IN A MULTI-THREADED COMPUTING ENVIRONMENT

(75) Inventor: Robert H Earhart, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 11/084,745

(22) Filed: Mar. 18, 2005

(65) Prior Publication Data
US 2006/0212456 A1 Sep. 21, 2006

(51) Int. Cl.
*G06F 17/30* (2006.01)
(52) U.S. Cl. .............................. 707/8; 707/10; 709/223; 719/316
(58) Field of Classification Search .................. 707/8, 707/103 Y, 100, 10; 711/151; 719/310, 316; 709/223
See application file for complete search history.

(56) References Cited

U.S. PATENT DOCUMENTS

| | | | | |
|---|---|---|---|---|
| 5,961,584 A | * | 10/1999 | Wolf | 718/103 |
| 6,708,224 B1 | * | 3/2004 | Tsun et al. | 719/316 |
| 7,209,918 B2 | * | 4/2007 | Li | 707/8 |
| 7,318,128 B1 | * | 1/2008 | Dice | 711/151 |

\* cited by examiner

*Primary Examiner*—John R. Cottingham
*Assistant Examiner*—Sherief Badawi
(74) *Attorney, Agent, or Firm*—Wolf, Greenfield & Sacks, P.C.

(57) ABSTRACT

An interlocked object transfer data structure is provided for enabling requests made by multiple threads to update objects in a multi-threaded computing environment to be executed by a single processing thread. An object in the interlocked object transfer data structure contains a pair of flags, which the processing thread manipulates via interlocked operations to manage updates for the object that are requested by multiple threads.

18 Claims, 7 Drawing Sheets

SYSTEM AND METHOD FOR UPDATING OBJECTS IN A MULTI-THREADED COMPUTING ENVIRONMENT

FIELD OF THE INVENTION

This invention relates generally to computer software and, more particularly, to multi-threaded computing environments.

BACKGROUND OF THE INVENTION

Traditionally, computer programs operate in single-threaded computing environments. A single-threaded computing environment means that only one task can operate within the computing environment at a given time. A single-threaded computing environment constrains both users and computer programs. For example, in a single-threaded computing environment, a user is able to run only one computer program at a time. Similarly, in a single-threaded computing environment, a computer program is able to run only one task at a time.

To overcome the limitations of single-threaded computing environments, multi-threaded computing environments have been developed. In a multi-threaded computing environment, a user typically is able to run more than one computer program at a time. For example, a user can simultaneously run both a word processing program and a spreadsheet program. Similarly, in a multi-threaded computing environment, a computer program is usually able to run multiple threads or tasks concurrently. For example, a spreadsheet program can calculate a complex formula that may take minutes to complete while concurrently permitting a user to still continue editing a spreadsheet.

In a multi-threaded computing environment, one or more threads ("update threads") may need to update a shared data structure. For example, a thread may set or clear timers in a shared timer queue data structure. Conventionally, two approaches—locking the data structure, and sending update requests to a single thread that owns the data structure—are used to synchronize access to the data structure. Locking the data structure requires update threads to wait on a lock of the data structure, which limits the scalability of the system. To send a request to a thread that owns the data structure, two approaches have conventionally been used: allocating a per-request block of memory, and blocking lock acquisition that locks the requested object in a data structure to prevent concurrent access to the requested object by both an update thread and a thread owning the data structure. Both approaches require the use of locks and each approach has its limitations.

The memory allocation approach is slow and prone to failure in low-resource scenarios. Conventionally, a block of memory is allocated for each request to update an object. Memory allocation for a request is slow because a lock is usually required to allocate memory. The memory allocation approach can also fail, for example, for lack of memory. Yet a request as fundamental as to update a timer should not fail for lack of memory.

The blocking lock acquisition approach limits the scalability and performance of a computing system. The blocking lock acquisition approach utilizes the lock associated with a data structure containing objects that multiple threads may request to update. Such a data structure may be a queue. A thread wishing to update an object in the data structure acquires the lock associated with the data structure and updates the object. Upon completing the updating, the thread releases the lock so another thread can acquire the lock and update the same or a different object in the data structure. The blocking lock acquisition approach serializes multiple threads' access to objects in the data structure, thus impairing a computing system's scalability and performance. For example, when multiple threads request to update objects in the data structure, a backlog can be induced. The backlog consists of threads waiting on the lock to be released before they can acquire the lock and proceed to update objects of interest in the data structure. These threads cannot do anything else until they have completed updating their objects of interest in the data structure. Such a backlog thus impairs system performance.

Therefore, there exists a need to update objects in a multi-threaded computing environment without using memory allocations or blocking lock acquisitions, so to avoid the limitations brought by using either of the two approaches.

SUMMARY OF THE INVENTION

This invention addresses the above-identified need by providing a mechanism for updating objects in a multi-threaded environment through the use of an interlocked object transfer data structure such as an interlocked object transfer queue. The interlocked object transfer data structure enables requests to update objects in memory made by multiple threads to be executed by a single processing thread, without using memory allocations or blocking lock acquisitions.

In accordance with one aspect of the invention, a system for updating objects in a multi-threaded computing environment is provided. The system includes at least one interlocked object transfer data structure, one or more update threads that request to update one or more objects in an interlocked object transfer data structure, and a processing thread that processes each object in the interlocked object transfer data structure to execute the latest request to update the object.

In accordance with another aspect of the invention, an interlocked object transfer data structure includes one or more objects, each of which contains data that have been requested by one or more update threads to update. Such an object further includes a pair of flags, named as Updating flag and In-Transition flag, for example. The pair of flags shares a single word of memory so that the flags can be manipulated as a unit. The processing thread manipulates the two flags via interlocked operations to process updates for the object that are requested by multiple update threads. Such an object may also be associated with a lock that synchronizes access to the object by the updating threads (but the lock is not used by the processing thread). Such an object may also include a pointer to the next object in the data structure. Preferably, the interlocked object transfer data structure also includes a mechanism for indicating whether the object in the interlocked object transfer data structure needs to be processed by the processing thread for the data structure.

In accordance with yet another aspect of the invention, a computer-implemented method for updating objects in a multi-threaded computing environment is provided. Upon receiving a request from an update thread to update data in an object, the method enables the update thread to link the object into an interlocked object transfer data structure. Multiple update threads may request to update data in an object. Preferably, when enabling an update thread to link an object into an interlocked object transfer data structure, the method enables the update thread to first acquire the lock associated with the object. The update thread then sets the Updating flag of the object. The update thread then writes the request to update the data of the object. The update thread then sets the In-Transition flag of the object and clears the Updating flag of the object, using a single interlocked operation. The update thread then releases the lock associated with the object and links the object to the interlocked object transfer data structure if the In-Transition flag of the object was clear when the single interlocked operation.

The method further enables the processing thread for the interlocked object transfer data structure to process each object in the interlocked object transfer data structure. The processing thread executes the latest update request for each object. When enabling the processing thread to process each object in the interlocked object transfer data structure, the method first enables the processing thread to capture the interlocked object transfer data structure, using an interlocked operation. Preferably, when processing an object in the interlocked object transfer data structure, the processing thread first clears the In-Transition flag of the object. The processing thread then captures the data in the object, using an interlocked operation. The processing thread then reads values of the In-Transition flag and the Updating flag of the object. If one of the two flags is set, then the data of the object may be in an inconsistent state, e.g., another update thread is updating the object. In this situation, the processing thread may discard the captured data of the object, since the another update thread will send the object to the interlocked object transfer queue again. If neither of the two flags is set, then the data of the object is consistent; the processing thread executes on the data of the object the latest request to update the object.

In accordance with a further aspect of the invention, a computer system comprising at least a memory and a processor is provided for implementing aspects of the invention.

In summary, the invention provides a mechanism for updating objects in a multi-threaded computing environment through the use of an interlocked object transfer data structure. The invention thus enables requests made by multiple update threads to update objects in memory to be executed by a single processing thread, without using memory allocations or blocking lock acquisitions. The invention thus avoids the limitations brought by using memory allocations or blocking lock acquisitions in updating objects in a multi-threaded computing environment. The invention thus improves the performance and scalability of a multi-threaded computing environment.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF PREFERRED EMBODIMENTS

In the following detailed description of exemplary embodiments of the invention, reference is made to the accompanying drawings that form a part hereof, and in which are shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

The detailed description is divided into four sections. In the first section, a system illustrating one embodiment of the invention is presented. In the second section, computerized processes, in accordance with an embodiment of the invention, are provided. In the third section, hardware and operating environment in conjunction with which embodiments of the invention may be practiced are described. Finally, in the fourth section, a conclusion of the detailed description is provided.

I. System

In this section of the detailed description, a description of a computerized system according to an exemplary embodiment of the invention is provided. The description is provided by reference to FIG. 1, where the interlocked object transfer data structure is an interlocked object transfer queue. As those of ordinary skill in the art will appreciate, data structures other than queues can also be used to contain one or more objects updated by one or more threads.

Figure 1:
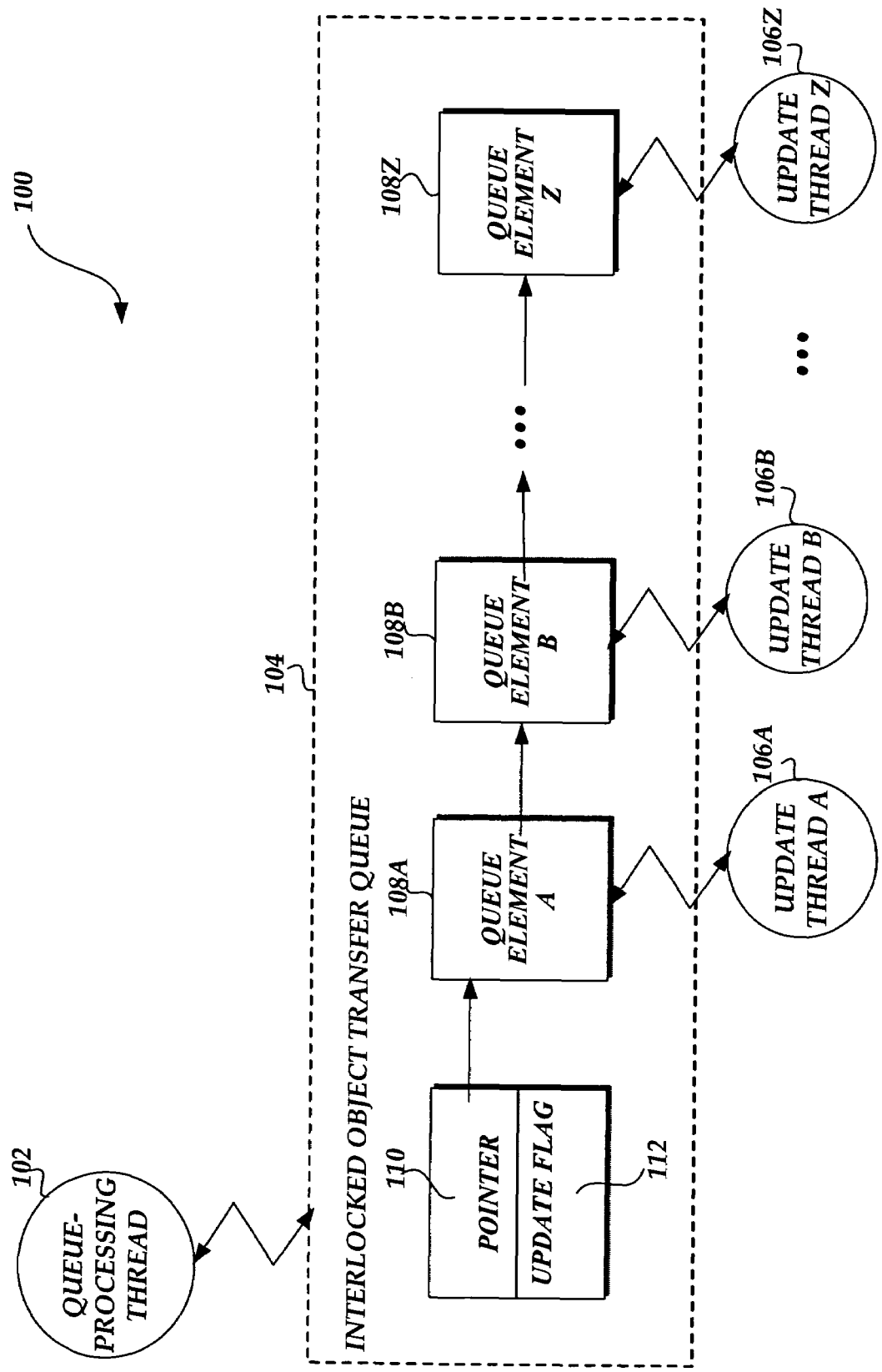
FIG. 1 is a block diagram illustrating an exemplary embodiment of the invention.

Referring now to FIG. 1, a system 100 according to an exemplary embodiment of the invention is shown. The system 100 includes a queue-processing thread 102, an interlocked objects transfer queue 104, and one or more update threads such as the representative update thread A 106A, update thread B 106B, and update thread 106Z. An update thread is a thread that requests to update an object in a multi-threaded computing environment.

As shown in FIG. 1, the interlocked object transfer queue 104 includes multiple QueueElement objects such as the representative QueueElement object A 108A, QueueElement object B 108B, and QueueElement object Z 108Z. The interlocked object transfer queue 104 also includes a pointer 110 that points to the first QueueElement object at the front of the queue, i.e., the QueueElement object A 108A. The interlocked object transfer queue 104 may also contain a mechanism that indicates whether any update thread has requested to update a QueueElement object in the interlocked object transfer queue 104. Such a mechanism can be an event or a flag, such as the update flag 112 illustrated in FIG. 1.

In exemplary embodiments of the invention, an interlocked object transfer queue such as the interlocked object transfer queue 104 is used to transfer objects such as QueueElement objects A-Z (108A-108Z) from one thread to another, without using a lock. In an exemplary embodiment of the invention, a transfer of objects among threads occurs, for example, when one or more update threads request to set timers. The operating system transfers the timers from the update threads that request to update the timer to a processing thread that is in charge of executing the requests. In other words, an update thread issues a request to update an object; and a processing thread processes such requests on objects included in an interlocked object transfer data structure. As shown in FIG. 1, the system 100 contains one or more update threads, such as the representative update thread A 106A, the update thread B 106B, and the update thread Z 106Z, each of which requests to update the QueueElement object A 108A, the QueueElement object B 108B, and the QueueElement object Z 108Z, respectively. The queue-processing thread 102 is the processing thread in charge of executing requests on QueueElement objects that the multiple update threads generate.

Figure 5:
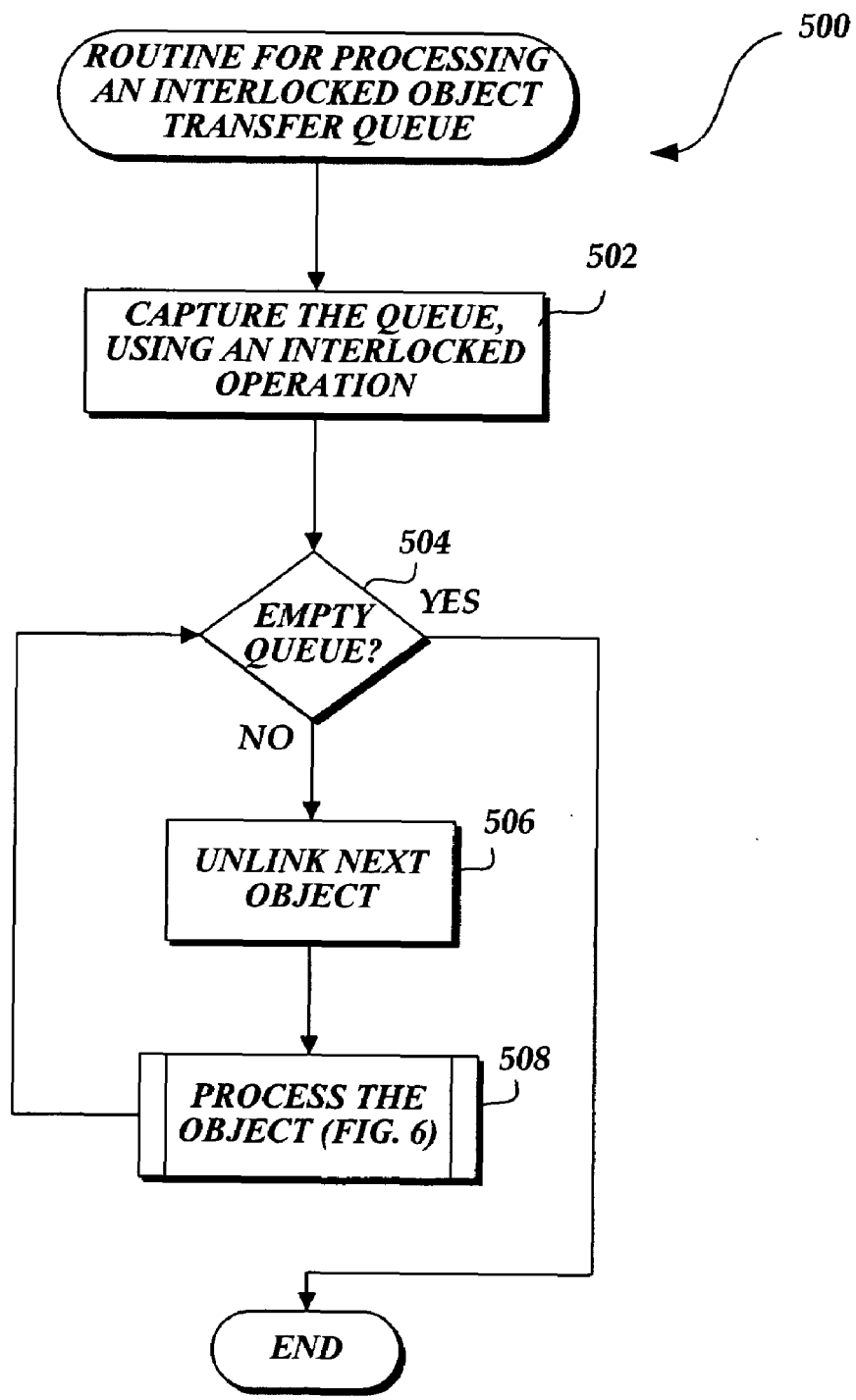
FIG. 5 is a flow diagram illustrating an exemplary routine where a queue-processing thread processes an interlocked object transfer queue.
Figure 6:
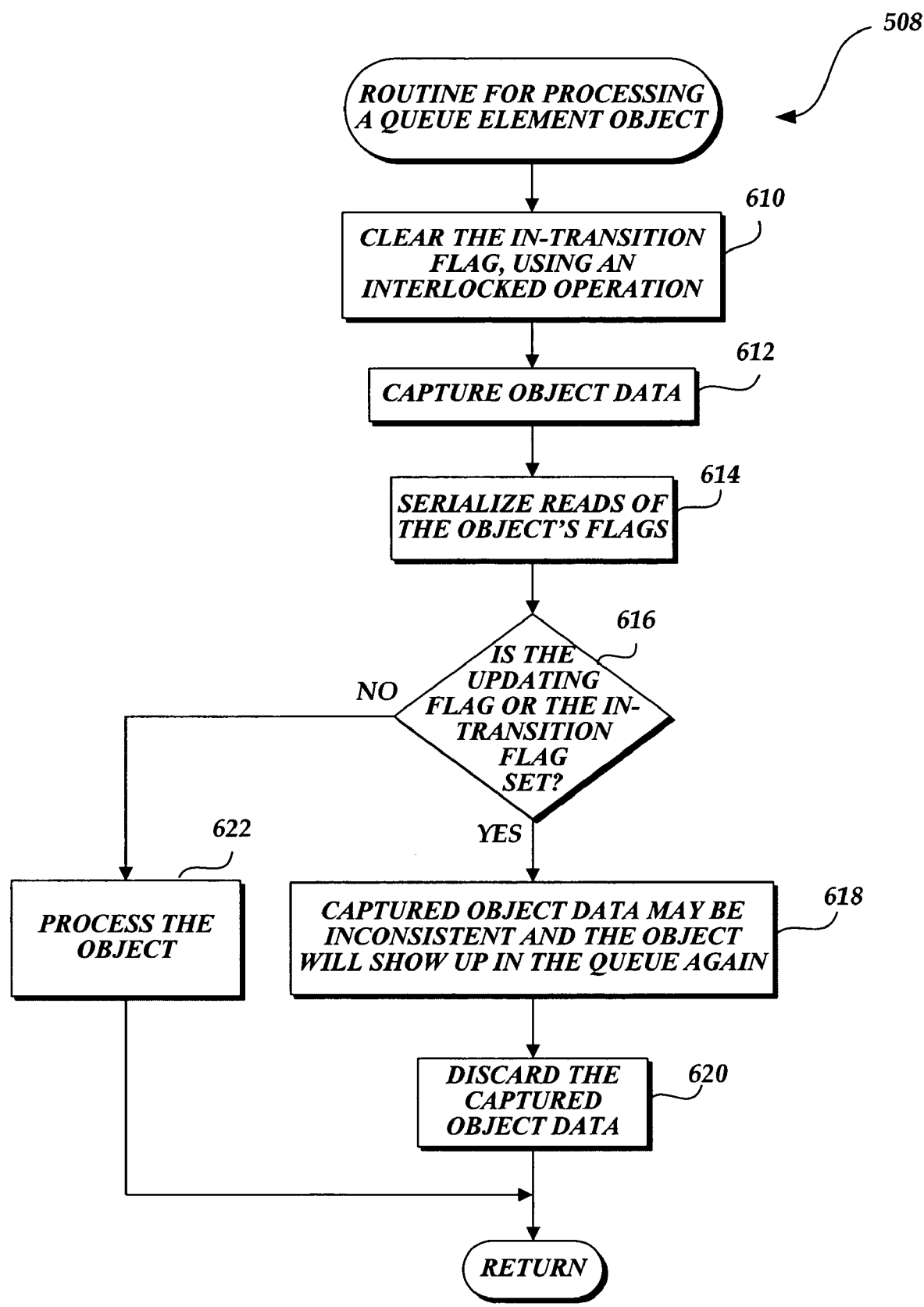
FIG. 6 is a flow diagram illustrating an exemplary routine where a queue-processing thread processes a QueueElement object in an interlocked object transfer queue, suitable for use in FIG. 5.

In embodiments of the invention, the queue-processing thread 102 processes each QueueElement object in the interlocked object transfer queue 104 and executes the latest request on a QueueElement object. FIGS. 5-6 illustrate exemplary routines where a queue-processing thread such as the queue-processing thread 102 processes each QueueElement object in a queue such as the interlocked object transfer queue 104. FIGS. 5-6 will be described in detail later.

Figure 2:
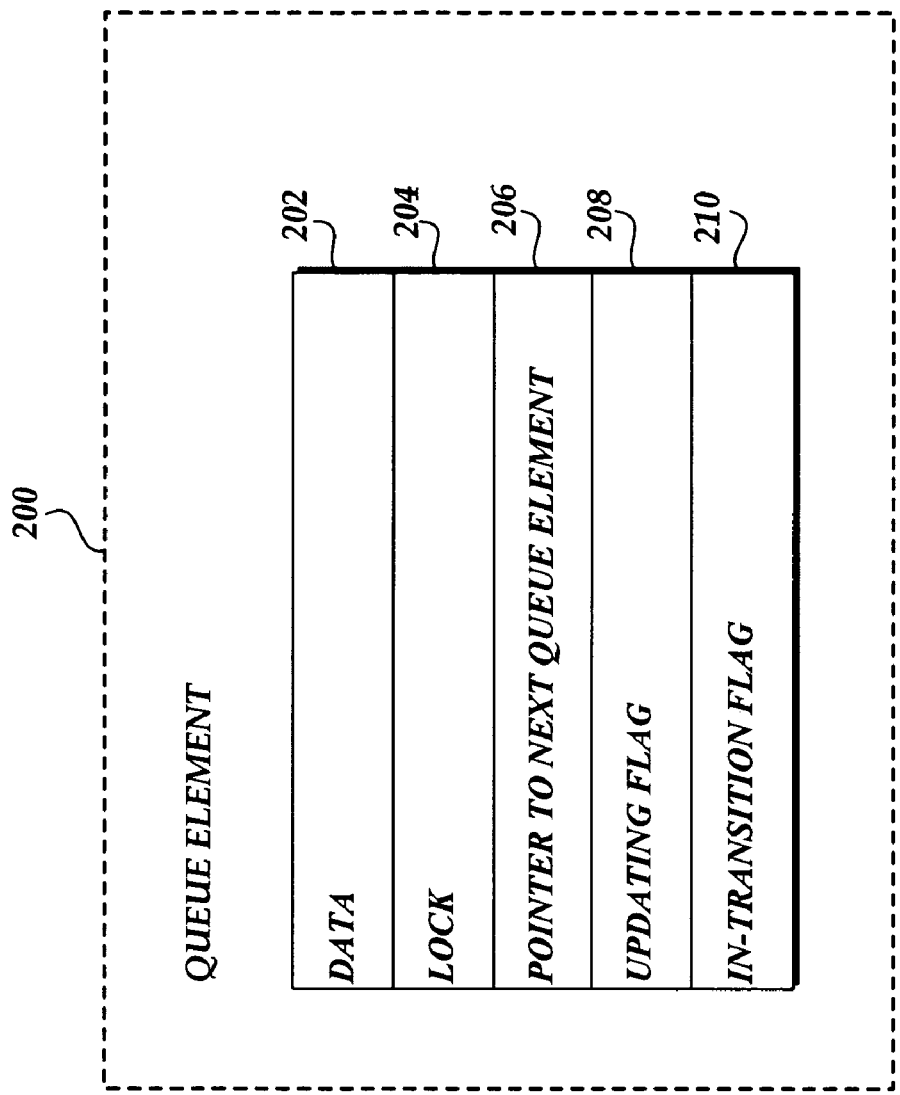
FIG. 2 is a block diagram illustrating an exemplary schema of a QueueElement object.

In embodiments of the invention, a QueueElement object in an interlocked object transfer queue includes mechanisms indicating the status of the QueueElement object—for example, whether the QueueElement object is being requested for updating by an update thread. FIG. 2 is a block diagram illustrating an exemplary schema of a QueueElement object 200. As shown in FIG. 2, the QueueElement object 200 includes a data field 202, whose content is requested to be updated by an update thread. The QueueElement object 200 also includes a lock 204 that serializes access to the QueueElement object 200. The QueueElement 200 also includes a pointer 206 that points to the next QueueElement object in the interlocked object transfer queue that the QueueElement object 200 is a part of.

Figure 3:
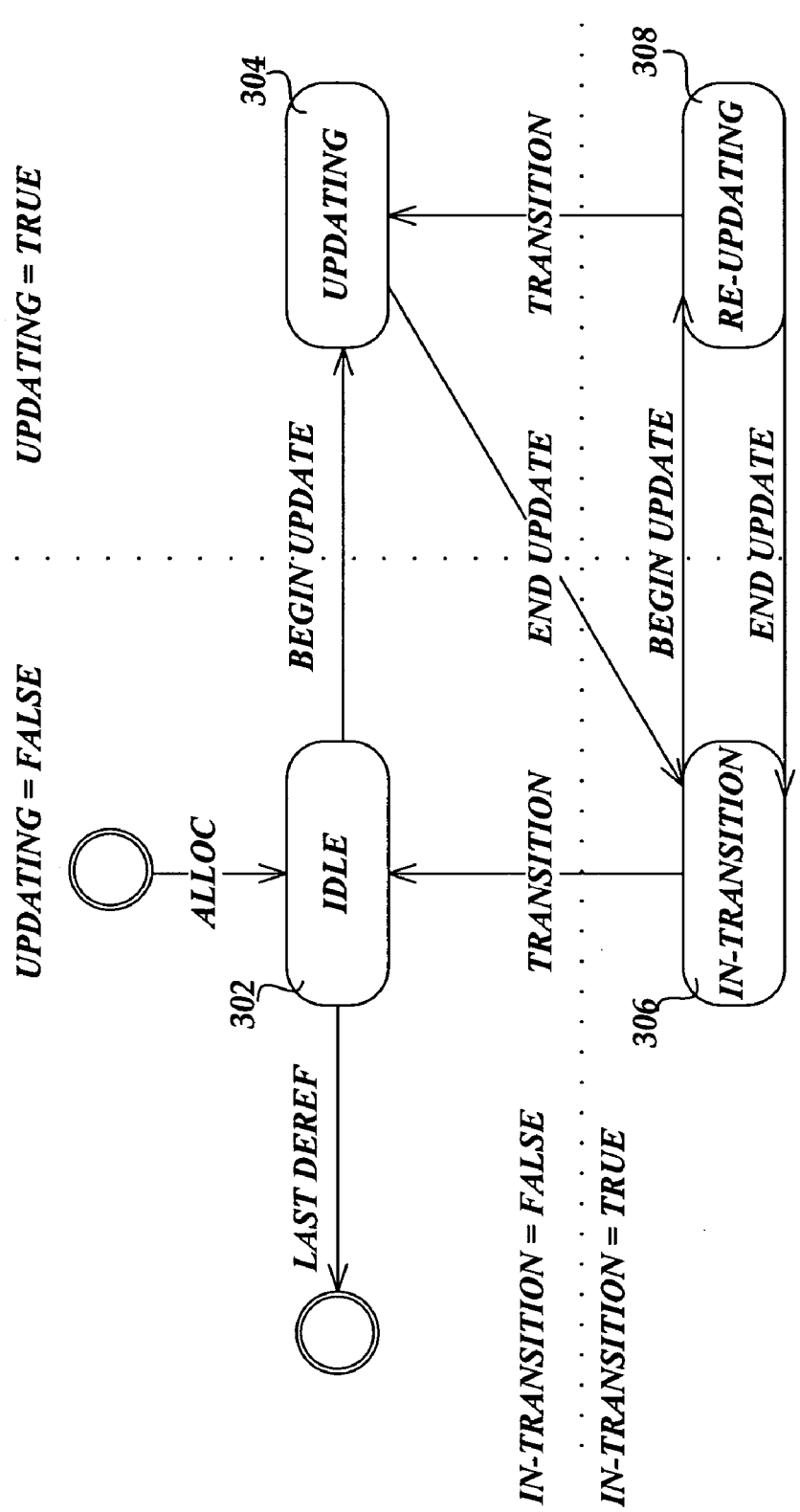
FIG. 3 is a block diagram illustrating four states that a QueueElement object may be in during the lifetime of the QueueElement object.

In embodiments of the invention, the QueueElement object 200 further includes two flags—the Updating flag 208 and the In-Transition flag 210. In an exemplary embodiment of the invention, the two flags share a single word of memory, so they can be manipulated together via interlocked operations, by one or more update threads and a queue-processing thread. According to the four possible permutations of the values of these two flags, the QueueElement object 200 can potentially be in four different states during the lifetime of the QueueElement object 200. FIG. 3 is a block diagram illustrating the lifetime of a QueueElement object such as the QueueElement object 200. As shown in FIG. 3, during the lifetime of a QueueElement object, the QueueElement object may go through four states: an Idle state 302, an Updating state 304, an In-Transition state 306, and a Re-Updating state 308. When a QueueElement object is initially allocated, both its Updating flag and In-Transition flag are initialized to FALSE, indicating that the QueueElement object is in the Idle state 302. The Idle state 302 suggests that the QueueElement object is not in the process of being updated by an update thread or processed by a queue-processing thread; therefore, the data in the object is consistent.

A QueueElement object transitions into an Updating state 304 when the QueueElement object is being updated by an update thread, i.e., the update thread requests to update data in the object. For example, a timer will be in the Updating state 304 when an update thread requests to set the timer. When a QueueElement object is in the Updating state 304, the object's Updating flag is set and the In-Transition flag is cleared; and the data in the QueueElement object may be in an inconsistent state.

As shown in FIG. 3, when an update thread finishes updating a QueueElement object, the object goes into the In-Transition state 306. In embodiments of the invention, a QueueElement object is in the In-Transition state 306 when it has been updated by an update thread and is yet to be processed by the queue-processing thread of the queue that the QueueElement object is in.

At times, a QueueElement object may be already in an interlocked object transfer queue and is to be processed by the corresponding queue-processing thread when the QueueElement object is updated by another update thread. Such a QueueElement object transitions from the In-Transition state 306 to the Re-Updating state 308 and data of the object may be in an inconsistent state.

Once the queue-processing thread has processed the QueueElement object and there is no further updates on the QueueElement object, the object returns to the Idle state 302. And if there is no existing reference to the object, the object is deleted from the multi-threaded computing environment.

II. Processes

In this section of the detailed description, computerized processes according to an embodiment of the invention are presented. The description is provided in reference to FIGS. 4-6. The computerized processes are desirably realized at least in part as one or more programs running on a computer—that is, as a program executed from a computer-readable medium such as a memory by a processor of a computer. The programs are storable on a computer-readable medium such as a floppy disk or a CD-ROM, for distribution, installation, and execution on another (suitably equipped) computer. Thus, in one embodiment, the updating of an object by an update thread and the processing of the object by a queue-processing thread are realized by the processor executing a program from the medium. The computerized processes can further be used in conjunction with the system 100 of FIG. 1, as will be apparent to those of ordinary skill in the art.

Exemplary embodiments of the invention utilize interlocked operations when accessing an interlocked object transfer data structure, an object in the interlocked object transfer data structure, and/or data and flags of the object. As those of ordinary skill in the art will appreciate, in a multi-threaded computing environment, interlocked operations provide atomic operations for variables, objects, and data structures that are shared by multiple threads. Various implementations of interlocked operations are available, including direct instruction set architecture (ISA) support and implementations built on more primitive hardware locked operations. For example, some ISAs provide "Load Locked" and "Store Conditional" instructions that can be used to built the interlocked operations.

Figure 4:
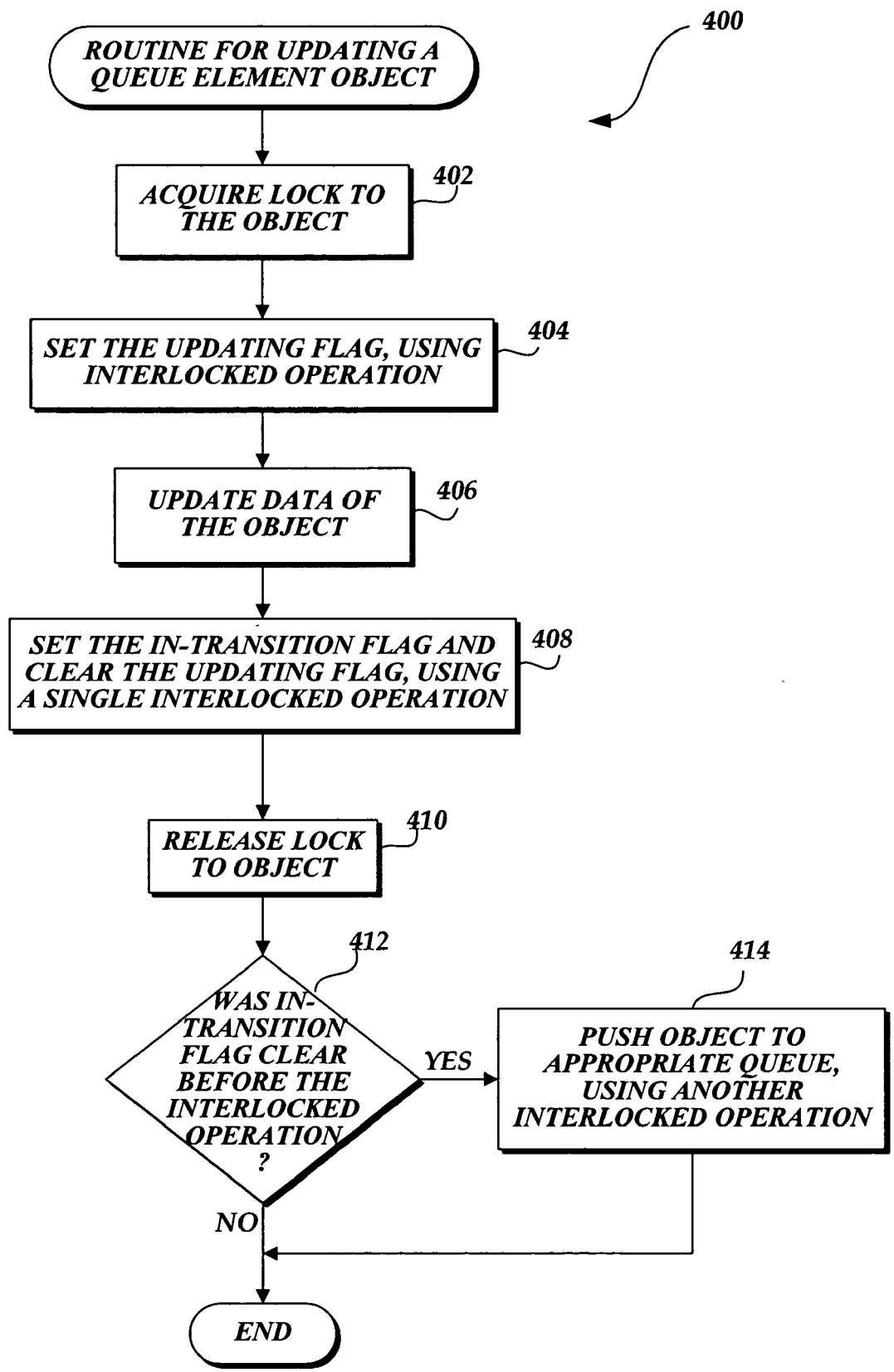
FIG. 4 is a flow diagram illustrating an exemplary routine where an update thread updates a QueueElement object.

FIG. 4 is a flow diagram illustrating an exemplary routine 400 where an update thread updates a QueueElement object. Specifically, the update thread first acquires the lock associated with the object. See block 402. Upon having successfully acquired the lock, the update thread sets the Updating flag of the object, using an interlocked operation. See block 404. The update thread then proceeds to update the object, i.e., update data of the object. See block 406. For example, if the object is a timer, the update thread may request to set or clear the timer. The update thread then sets the In-Transition flag of the object and clears the Updating flag of the object, using a single interlocked operation. See block 408. The update thread then releases the lock associated with the object. See block 410. At this moment, the update thread checks to determine if the In-Transition flag of the object was clear when the interlocked operation in block 408 took place—the original state of the flags can be returned by the interlocked operation used in block 408. See decision block 412. If the In-Transition flag of the object was clear before the interlocked operation in block 408 took place, it indicates that the object has not been listed as one of the objects to be processed by a queue-processing thread. Therefore, when the answer to the decision block 412 is YES, the update thread pushes the object to the beginning of an appropriate interlocked object transfer queue for a queue-processing thread to process, using another interlocked operation. See block 414. If the answer to the decision block 412 is NO, meaning that the object has already been in a queue and is to be processed by the corresponding queue-processing thread, the routine 400 terminates. As a result of executing the routine 400, a QueueElement object becomes part of an interlocked object transfer queue and will be processed by the queue-processing thread owning the interlocked object transfer queue.

FIG. 5 illustrates an exemplary routine 500 where a queue-processing thread processes an interlocked object transfer queue. In embodiments of the invention, an interlocked object transfer queue is processed by a single thread at a time, i.e., a queue-processing thread. In an exemplary embodiment of the invention, the queue-processing thread of a queue can be any of the update threads that update an object in the queue. For instance, after updating an object in the queue, an update thread can become the queue-processing thread by acquiring a lock associated with the queue.

As shown in FIG. 5, the queue-processing thread first captures the queue, for example, by using a Win32 API function call InterlockedExchangePointer ( ). See block 502. The InterlockedExchangePointer ( ) function uses an interlocked operation to swap the pointer to the head of the queue with NULL. Optionally, when it is important to process update requests in the order received, the queue-processing thread may reverse the order of the objects in the queue after capturing the queue. The queue-processing thread then checks whether the queue is empty. See decision block 504. If the answer is YES, then there is no object in the queue to be processed by the queue-processing thread; the routine 500 terminates. Otherwise, the queue-processing thread proceeds to process each object in the queue by first unlinking from the queue the next object, i.e., the first object in the queue. See block 506. The queue-processing thread then proceeds to execute a sub-routine 508 that processes the unlinked object. FIG. 6 is a flow diagram illustrating an exemplary sub-routine 508 and will be discussed in detail shortly. After executing the sub-routine 508, the queue-processing thread proceeds to check whether there is another object in the queue by looping back to the decision block 504. If there is another object in the queue, the queue-processing thread unlinks the object from the queue and processes the object. Otherwise, the routine 500 terminates.

FIG. 6 is a flow diagram illustrating an exemplary implementation of the sub-routine 508 where a queue-processing thread processes a QueueElement object in an interlocked object transfer queue. For each QueueElement object, the queue-processing thread first clears the In-Transition flag associated with the object, using an interlocked operation. See block 610. The queue-processing thread then captures the data of the object. See block 612. The queue-processing thread then proceeds to read the flags associated with the object. In embodiments of the invention, the readings of the flags are serialized. See block 614. In an exemplary embodiment of the invention, the queue-processing thread serializes instructions for the readings of the flags, for example, by using a MemoryBarrier ( ) function call. Preferably, the serialization of the instructions for the readings of the flags does not need a full read barrier. A partial barrier is sufficient as along as it secures that the particular read instruction is done such that the values read for the flags reflect values of the flags presented at the time when the data of the object that were read were originally written, or reflect values of the flags that were written after the time when the data of the object that were read were originally written.

The thread queue-processing then proceeds to determine whether either the Updating flag or the In-Transition flag is set. See decision block 616. If the answer is YES, it means that the captured object data may be inconsistent and that the object will show up in the interlocked object transfer queue again. See block 618. Thus the current captured object data will be out-dated. Preferably, The queue-processing thread discards the captured object data. See block 620. The sub-routine 508 returns and the queue-processing thread proceeds to process the next object in the interlocked object transfer queue.

On the other hand, if the answer to decision block 616 is NO, meaning neither the Updating flag nor the In-Transition flag is set, then the captured object data is stable and consistent; thus the queue-processing thread proceeds to process the object, i.e., executing the latest request for updating the object. See block 622. For example, if the object is a timer, the queue-processing thread may execute a request from an update thread to update the state of the timer. The queue-processing thread may remove the timer from the timer queue. Optionally, according to the request, the queue-processing thread may re-insert the timer into the queue, potentially at a different expiration time. After processing the object, the sub-routine 508 then returns. The queue-processing thread proceeds to process the next object in the interlocked object transfer queue, if there is another object available.

III. Hardware and Operating Environment

Figure 7:
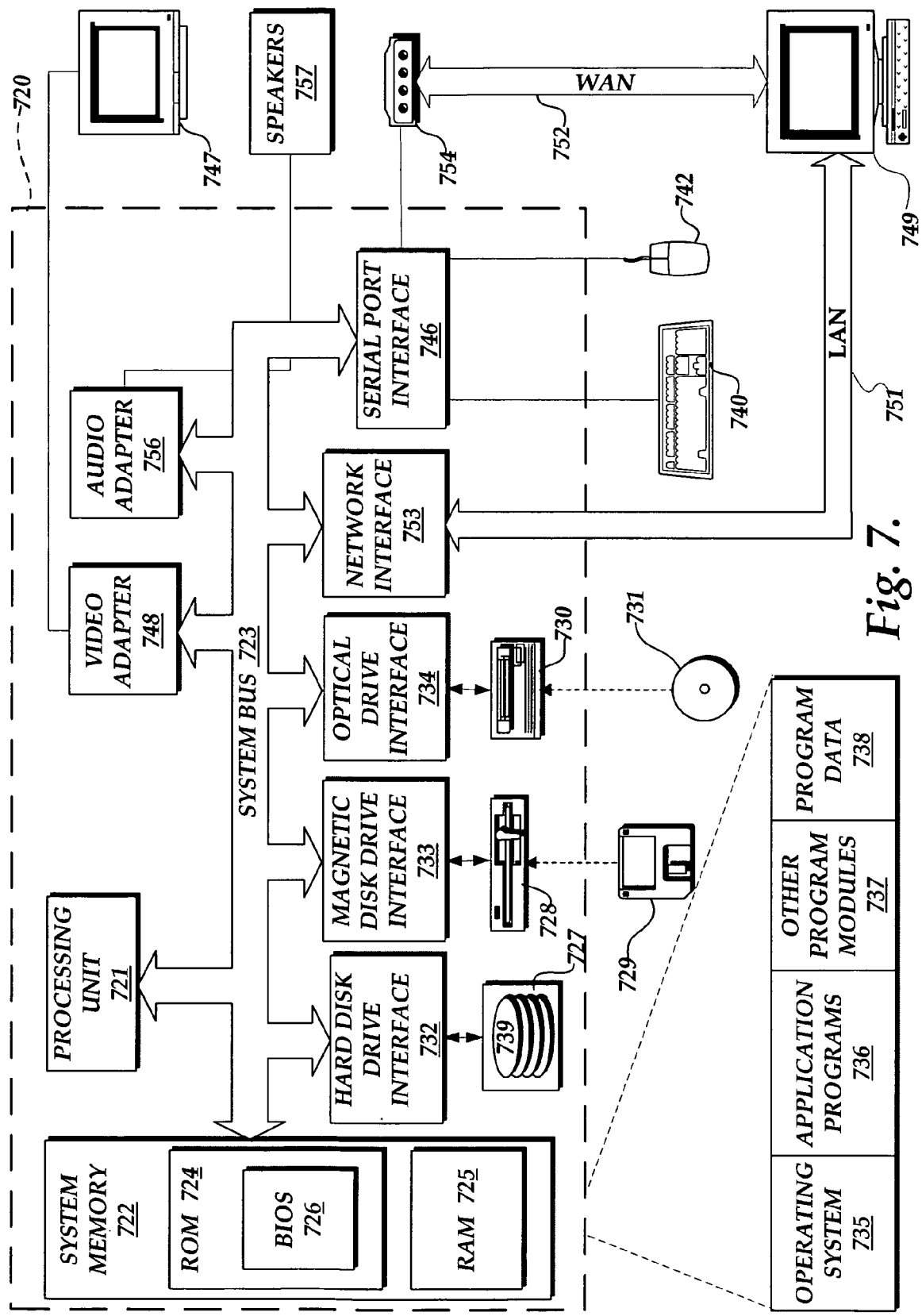
FIG. 7 is a block diagram illustrating an exemplary computing environment in which aspects of the invention may be implemented.

FIG. 7 and the following discussion are intended to provide a brief and general description of a suitable computing environment in a client device in which the invention may be implemented.

Although not required, the invention will be described in the context of computer-executable instructions, such as program modules, being executed by a personal computer. Generally, program modules include routines, programs, objects, components, data structures, etc., that perform particular tasks or implement particular abstract data types.

Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. As noted above, the invention may also be practiced in distributed computing environments where tasks are performed by remote processing devices that are linked through a communications network. In a distributed computing environment, program modules may be located in both local and remote memory storage devices. It should be further understood that the present invention may also be applied to devices that may not have many of the components described in reference to FIG. 7 (e.g., hard disks, etc.).

With reference to FIG. 7, an exemplary system for implementing the invention includes a general purpose computing device in the form of a conventional personal computer 720. The personal computer 720 includes a processing unit 721, a system memory 722, and a system bus 723 that couples various system components including the system memory to the processing unit 721. The system bus 723 may be any of several types of bus structures, including a memory bus or memory controller, a peripheral bus, and a local bus using any of a variety of bus architectures. The system memory includes read only memory (ROM) 724 and random access memory (RAM) 725. A basic input/output system 726 (BIOS), containing the basic routines that help to transfer information between elements within the personal computer 720, such as during start-up, is stored in ROM 724.

The personal computer 720 further includes a hard disk drive 727 for reading from and writing to a hard disk 739, a magnetic disk drive 728 for reading from or writing to a removable magnetic disk 729, and an optical disk drive 730 for reading from or writing to a removable optical disk 731, such as a CD-ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of computer-readable instructions, data structures, program modules, and other data for the personal computer 720.

Although the exemplary environment described herein employs a hard disk 739, a removable magnetic disk 729, and a removable optical disk 731, it should be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk 739, magnetic disk 729, optical disk 731, ROM 724, or RAM 725, including an operating system 735, one or more application programs 736, other program modules 737, and program data 738.

A user may enter commands and information into the personal computer 720 through input devices, such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port, or a universal serial port (USB). A monitor 747 or other type of display device is also connected to the system bus 723 via an interface, such as a video adapter 748. In addition to the monitor, personal computers typically include other peripheral output devices, such as speakers 757 that are connected to the system bus 723 via an interface, such as an audio adapter 756.

The personal computer 720 may operate in a networked environment using logical connections to one or more remote computers, such as a remote computer 749. The remote computer 749 may be another personal computer, a server, a router, a network PC, a peer device, or other common network node, and typically includes many or all of the elements described above relative to the personal computer 720, although only a memory storage device has been illustrated in FIG. 7. The logical connections depicted in FIG. 7 include a local area network (LAN) 751 and a wide area network (WAN) 752. Such networking environments are commonplace in offices, enterprise-wide computer networks, Intranets, and the Internet.

When used in a LAN networking environment, the personal computer 720 is connected to the local network 751 through a network interface or adapter 753. When used in a WAN networking environment, the personal computer 720 typically includes a modem 754 or other means for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It will be appreciated that the network connections shown are exemplary and other means of establishing a communications link between the computers may be used.

IV. Conclusion

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the following claims and equivalents thereof.

The embodiments of the invention in which an exclusive property or privilege is claimed are defined as follows:

1. A system for updating objects in a multi-threaded computing environment, the system comprising:
   a processor; and
   tangible computer storage media having computer-executable instructions, when executed by the processor, for implementing:
      a plurality of update threads that request to update an object by writing data in a transfer data structure in the computer storage media, the transfer data structure comprising state information and a lock to serialize access to the transfer data structure by each of the plurality of threads; and
      a processing thread that accesses the transfer data structure to selectively process data in the data structure based on the state information to execute the latest request to update the object,
   wherein:
      the state information comprises a first flag indicating whether the transfer data structure is being updated by an update thread of the plurality of update threads and a second flag indicating whether the data in the transfer data structure is unprocessed by the processing thread;
      the processing thread selectively processes data in the transfer data structure by:
         setting the second flag to indicate that the data in the transfer data structure has been processed;
         after setting the second flag, capturing the data in transfer object;
         after capturing the data, checking whether the state information indicates that the transfer data structure is in an inconsistent state based on one or more of:
            the first flag indicating that the transfer data structure is being updated by an update thread, or
            the second flag indicating that the data in the transfer data structure is unprocessed;
         based on the checking, using the captured data to update the object when the transfer data structure is not in an inconsistent state; and
         discarding the captured data, without updating the object using the captured data, when the transfer data structure is in an inconsistent state.

2. The system of claim 1, wherein the first flag and the second flag are stored in a memory word, whereby both the first flag and the second flag are accessed in an atomic operation of the processor.

3. The system of claim 1, wherein one of the update threads becomes the processing thread after the update thread has issued its request to update the object by recording data in the transfer data structure.

4. A computer-implemented method for updating objects in a multi-threaded computing environment, comprising:
operating a processor to:
from an update thread:
writing data signifying a request to update an object, the writing being in a transfer data structure in memory of the computer;
writing state information in the transfer data structure indicating that the transfer data structure is in a state in which it is not being updated by the update thread and contains data that has not been processed:
selectively linking the transfer data structure into a queue based on state information for the transfer data structure prior to the writing the state information, the selectively linking comprising linking the transfer data structure in the queue when the state information prior to the writing indicated that the transfer data structure contained data that was not processed and omitting linking when the state information prior to the writing did not indicate that the transfer data structure contained data that was not processed; and
in a processing thread selectively processing one or more transfer data structures in the queue, wherein;
the processing thread executes the latest request to update the object based on state information for the transfer data structure in the queue associated with the object;
wherein the state information comprises a first flag indicating whether the transfer data structure is being updated by an update thread of the plurality of update threads and a second flag indicating whether the data in the transfer data structure is unprocessed by the processing thread;
the processing thread selectively processes data in the transfer data structure by:
setting a second flag to indicate that the data in the transfer data structure has been processed;
after setting the second flag, capturing the data in transfer object;
after capturing the data, checking whether the state information indicates that the transfer data structure is in an inconsistent state based on one or more of:
a first flag indicating that the transfer data structure is being updated by an update thread, or
the second flag indicating that the data in the transfer data structure is unprocessed;
based on the checking, using the captured data to update the object when the transfer data structure is not in an inconsistent state; and
discarding the captured data, without updating the object using the captured data, when the transfer data structure is in an inconsistent state.

5. The computer-implemented method of claim 4, wherein:
the transfer data structure in the computer memory comprises, in addition to the data, a lock; and
the state information comprises:
the first flag, the first flag being an Updating flag; and
the second flag, the second flag being an In-Transition flag; and
the Updating flag and the In-Transition flag are stored as one memory word; and
access to the object data, the lock, the Updating flag, and the In-Transition flag is serialized by the lock.

6. The computer-implemented method of claim 5, wherein operating the processor further comprises, from the update thread:
prior to writing the data signifying the request:
acquiring the lock of the transfer data structure;
set the Updating flag;
subsequent to writing the data signifying the request to update the object:
setting the In-Transition flag of the object and clearing the Updating flag of the object in a single interlocked operation; and
releasing the lock of the object.

7. The computer-implemented method of claim 5, wherein executing, by the processing thread, the latest request to update the object comprises:
process each transfer data structure in the queue, wherein when the transfer data structure associated with the object is processed, the processing comprises selectively updating the object using the data in the transfer data structure based on the state of the updating flag and the in-transition flag, the selectively updating comprising:
when neither the updating flag nor the in-transition flag is set, updating the object and removing the transfer data structure from the queue; and
when the updating flag or the in-transition flag is set or both the updating flag and the in-transition flag are set, removing the transfer data structure from the queue without updating the object.

8. The computer-implemented method of claim 7, wherein the selectively processing of the transfer data structure associated with the object comprises clearing the In-Transition flag of the transfer data structure;
subsequent to clearing the in-transition flag, capturing the data in the transfer data structure;
subsequent to capturing the data, reading values of the In-Transition flag and the Updating flag of the object;
if the In-Transition flag or the Up dating flag is set or both the updating flag and the in-transition flag are set, discarding the captured data from the transfer data structure; and
if neither of the In-Transition flag and the Updating flag is set, updating the object based on the captured data as the latest request to update the object.

9. The computer-implemented method of claim 4, wherein the update thread becomes the processing thread after the update thread has linked the object into the data structure.

10. A computer system, comprising:
(a) a memory; and
(b) a processor, coupled with the memory, executing the computer executable instructions to provide:
(i) a plurality of update threads that each generate requests to update at least one object that upon a request from an update thread of the plurality of update threads to update an object, the update thread implements a process comprising:
obtaining a lock on a transfer data structure in the memory, the transfer data structure being associated with the object;
while the lock is in place, storing state information in the transfer data structure indicating that the transfer data object is being updated;

while the state information indicates that the transfer data structure is being updated, storing data indicating the request in the transfer data structure;

while the lock is in place and after the data has been stored, storing state information in the transfer data structure indicating that the transfer data object is not being updated and contains data that has not been processed;

releasing the lock;

checking whether the transfer data structure is linked in a queue; and when the transfer data structure is not linked in the queue, linking the transfer data structure into the queue; and (ii) a processing thread that processes each transfer data structure in the queue, wherein the processing thread selectively updates an object of the at least one object for each transfer data structure processed, the selectively updating being based on state information stored in the data transfer structure, wherein selectively updating the object comprises:

A) setting the state information to indicate that the data in the transfer data structure has been processed;

B) after setting the state information in A), capturing the data in transfer object;

C) after capturing the data, checking whether the state information indicates that the transfer data structure is in an inconsistent state based on one or more of:

the state information indicating that the transfer data structure is being updated by an update thread, or the state information indicating that the data in the transfer data structure is unprocessed:

D) based on the checking, using the captured data to update the object when the transfer data structure is not in an inconsistent state; and E) discarding the captured data, without updating the object using the captured data, when the transfer data structure is in an inconsistent state.

11. The computer system of claim 10, wherein the state information in each transfer data structure comprises:
an Updating flag; and
an In-Transition flag.

12. The computer system of claim 11, wherein:
storing state information indicating that the transfer data object us being updated comprises:
setting the Updating flag of the object;

storing state information in the transfer data structure indicating that the transfer data object is not being updated and contains data that has not been processed comprises:
setting the In-Transition flag of the object and clearing the Updating flag of the object in a single interlocked operation;

linking the transfer data structure into the queue when the transfer data structure is not linked in the queue comprises:
linking the transfer data structure into the queue if the In-Transition flag is clear.

13. The computer system of claim 11, wherein the processing thread processes each transfer data structure by:
capturing the queue using an interlocked operation; and
processing each transfer data structure in the queue by unlinking each object from the queue and capturing the data in the transfer data structure.

14. The computer system of claim 13, wherein the processing thread processes each transfer data structure by acts that further comprise:
clearing the In-Transition flag of an object before capturing the data in the transfer data structure;
reading the values of the In-Transition flag and the Updating flag of the transfer data structure after capturing the data in the transfer data structure;
if the In-Transition flag or the Updating flag is set or both the Updating flag and the In-Transition flag are set, discarding the captured object without updating the object; and
if neither of the In-Transition flag and the Updating flag is set, updating the object using the captured data.

15. The computer system of claim 10, wherein the update thread becomes the processing thread after the update thread links the transfer data structure into the queue.

16. The system of claim 1, wherein:
the state information for each transfer data structure consists of information identifying one of four states: an idle state, an updating state, an in-transition state and a re-updating state.

17. The system of claim 16, wherein the object comprises a timer.

18. The system of claim 17, wherein
the system further comprises computer-executable instructions that, when executed, provide an operating system; and
the processing thread is operated by the operating system.

* * * * *